UNITED STATES PATENT OFFICE.

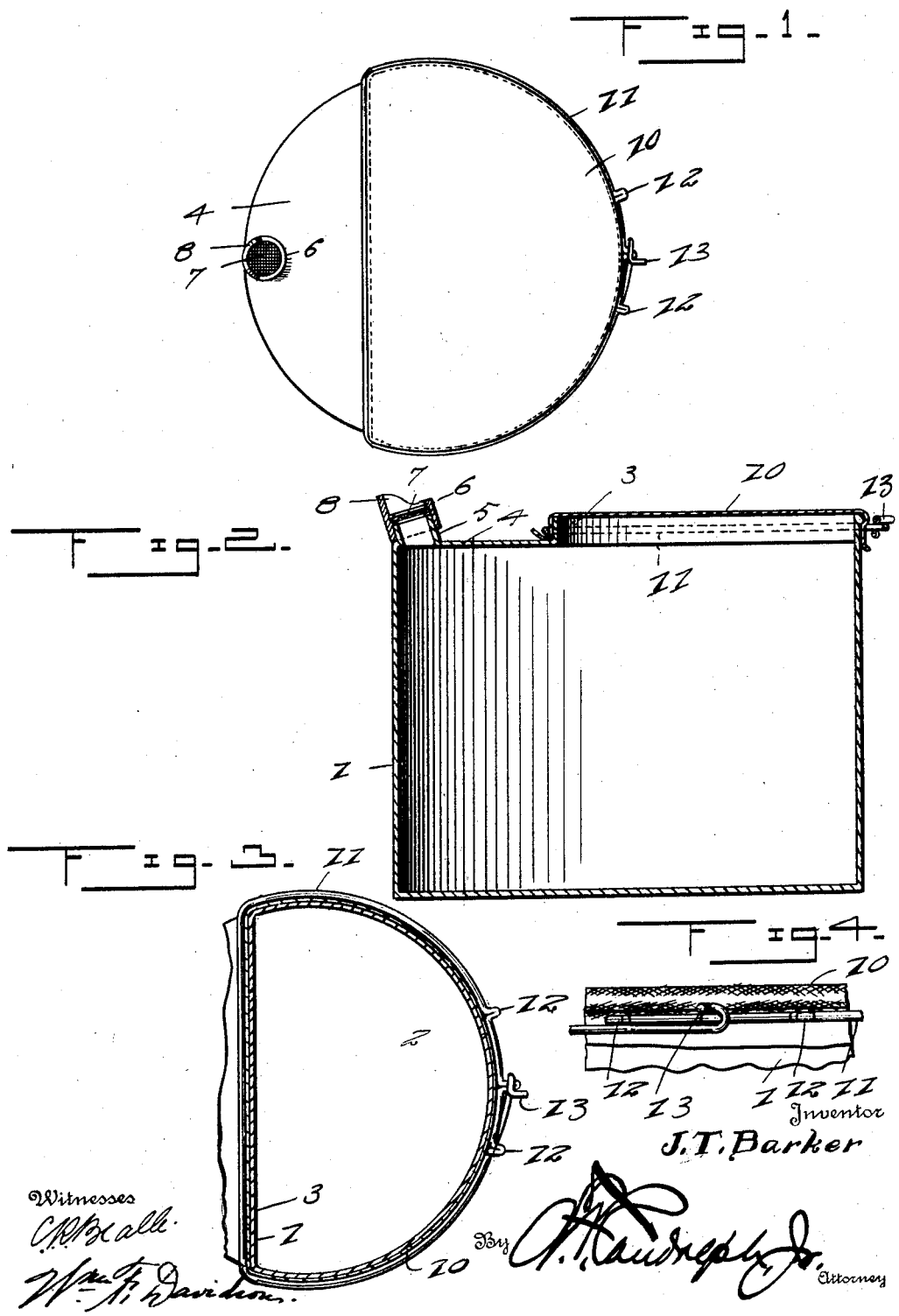

JOHN T. BARKER, OF LEXINGTON, KENTUCKY.

STRAINER-STRETCHER.

1,385,899.  Specification of Letters Patent.  Patented July 26, 1921.

Application filed December 15, 1916. Serial No. 137,142.

*To all whom it may concern:*

Be it known that I, JOHN T. BARKER, a citizen of the United States, residing at Lexington, in the county of Fayette and State of Kentucky, have invented certain new and useful Improvements in Strainer-Stretchers; and I do hereby declare the following to be a full, clear, and exact description of the invention, such as will enable others skilled in the art to which it appertains to make and use the same.

This invention relates to a milk pail and has for one of its objects, the provision of a device of this character, wherein the milk will be strained prior to entering the pail and which will again be strained when being dispensed from the pail, obviating any danger of the milk becoming infected with dirt or other foreign matter during the process of milking cows.

Another object of this invention is to provide a bucket or pail having a frusto-circular opening surrounded by an upstanding flange over which is secured fabric or the like for the purpose of straining milk prior to entering the pail or bucket, thus obviating any danger of dirt or other foreign matter from falling into the pail or bucket during the process of milking.

A further object of this invention is the provision of means for clamping the fabric or like upon the upstanding flange of the frusto-circular opening so that the fabric or like may be readily removed when desiring to clean the bucket or fabric after the process of milking.

A further object of this invention is to provide a bucket or pail closed at its upper end by an integral wall having formed thereon an outlet spout to which is secured a removable strainer for the purpose of straining the milk when dispensing the same from the bucket or receptacle.

A still further object of this invention is the provision of a milk pail of the above stated character, which shall be simple, durable and efficient, and which may be manufactured and sold at a comparatively low cost.

With these and other objects in view as will become more apparent as the description proceeds, the invention consists in certain novel features of construction, combination and arrangements of parts as will be hereinafter more fully described and claimed.

For a complete understanding of my invention, reference is to be had to the following description and accompanying drawings, in which:

Figure 1 is a top plan view of a milk pail constructed in accordance with my invention, Fig. 2 is a vertical sectional view of the same, Fig. 3 is a fragmentary detail sectional view illustrating the means of removably securing the fabric to the frusto-circular opening of the pail, Fig. 4 is a fragmentary detail elevation of the means for securing the ends of a clamping hook together.

Referring in detail to the drawing, the numeral 1 indicates a pail or bucket having in the top thereof, a frusto-circular opening 2 surrounded by an upstanding flange 3. The remaining portion of the top of the pail 1 being closed by an integral wall 4 in which is formed an outlet spout 5 having mounted thereon a removable band 6 carrying a strainer 7. The band 6 has an extension 8 formed thereon providing a spout to facilitate the dispensing of milk from the pail 1 into another receptacle having a comparatively small inlet port, (not shown).

Fabric or the like 10 is placed over the upstanding flange 3 and entirely covering the opening 2 and is secured upon the flange 3 by a frusto-circular hoop 11, one end of which is bent upon itself at several intervals to form lugs 12 any one of which are adapted to be engaged by a hook 13 formed upon the other end of the hoop 11, so that the hoop 11 may be adjustably secured about the upstanding flange 3 to tightly secure the fabric 10 over the opening 2.

In operation, when milking a cow, the milk is directed upon the fabric 10 and passes therethrough becoming thoroughly strained into the pail 1; when desiring to empty the pail 1, the milk is poured outwardly through the spout 5 through the strainer 7 into another receptacle, thereby straining the milk again. Thus it will be seen that a milk pail has been provided whereby the milk will be strained prior to entering the pail and will again be strained when dispensed therefrom. This type of milk pail affords a very sanitary one, which will prevent any danger of the milk being infected by dirt or any foreign matter.

While I have shown and described the preferred embodiment of my invention, it will be understood that minor changes in construction, combination and arrangement of parts may be made without departing from the spirit and scope of the invention as claimed.

Having thus described my invention, what I claim is:

A stretcher for strainers for receptacles having a top of semi-circular form comprising a wire bent in semi-circular form with its free ends midway of the circular portion, a plurality of radially outward crimps on one of the ends and a socket for the crimps on the other end, the socket terminating in a radial projection.

In testimony whereof I affix my signature in presence of two witnesses.

JOHN T. BARKER.

Witnesses:
MARY DOLAN,
C. H. CARTER.